United States Patent Office 3,732,315
Patented May 8, 1973

3,732,315
PRODUCTION OF AROMATIC HYDROXY-ALDEHYDES
Herwig Hoffmann, Frankenthal, and Joachim Datow and Gotthilf Wenner, Ludwigshafen, Germany, assignors to Badische Anilin- & Soda-Fabrik Aktiengesellschaft, Ludwigshafen (Rhine), Rhineland-Pfalz, Germany
No Drawing. Filed May 13, 1970, Ser. No. 37,038
Int. Cl. C07c 45/00
U.S. Cl. 260—600                  2 Claims

ABSTRACT OF THE DISCLOSURE

A process for the production of an aromatic hydroxyaldehyde which may contain inert substituents and which has the general formula:

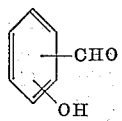

(I)

and which may have another benzene ring condensed onto the benzene ring, wherein an aromatic methylchloroformic acid ester which may contain inert substituents and which has the general formula:

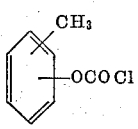

(II)

and which may have another benzene ring condensed onto the benzene ring is first chlorinated to form a dichloromethylchloroformic ester which may contain inert substituents, which has the general formula:

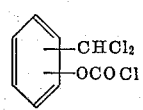

(III)

and which may have another benzene ring condensed onto the benzene ring, and the resultant dichloromethylchloroformic ester (III) is then hydrolyzed to the aromatic hydroxyaldehyde (I).

---

The present invention relates to a new process for the production of aromatic hydroxyaldehydes by chlorination of certain aromatic compounds and hydrolysis of the resultant aromatic dichloromethyl compounds.

It is known from Houben-Weyl, "Methoden der organischen Chemie," vol. 7/1, 36 (1954), that aromatic hydroxyaldehydes can be prepared by the method of Reimer and Tiemann by the reaction of phenols with chloroform and caustic soda solution. This method is however dependent to a very considerable extent on the constitution of the compounds used and gives yields which as a rule are only from 20 to 30% of the theory. The method of Reimer and Tiemann is therefore no longer of industrial importance. A process for the production of salicylaldehyde is also known from the said volume of Houben-Weyl, page 214, in which o-cresol is converted into di-o-tolyl carbonate which is then chlorinated and finally the chlorination product obtained is hydrolysed under a pressure of 5 atmospheres. This method has the disadvantage that in the reaction to form the dicarbonate the yields are unsatisfactory and the vacuum distillation of the dicarbonate as well as the vacuum distillation of the tetrachlorinated product is very expensive because of the high boiling points and melting points of the compounds. Moreover resinification occurs to a certain extent during the hydrolysis of the tetrachlorinated prodduct, which results in a further decrease in the yield.

We have now found that aromatic hydroxyaldehydes which may contain inert substituents and which have the general formula:

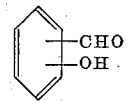

(I)

and which may have another benzene ring condensed onto the benzene ring can be advantageously prepared by first chlorinating an aromatic methylchloroformic ester which may contain inert substituents and which has the general formula:

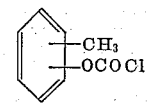

(II)

and which may have another benzene ring condensed onto the benzene ring to form an aromatic dichloromethylchloroformic ester which may contain inert substituents and which has the general formula:

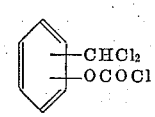

(III)

and which may have another benzene ring condensed onto the benzene ring and then hydrolyzing the resultant dichloromethylchloroformic ester (III) to the aromatic hydroxyaldehyde (I).

According to the new process the aromatic hydroxyaldehydes (I) are obtained in excellent yields and in high purity. The aromatic dichloromethylchloroformic esters (III) may be hydrolyzed at a pressure as low as atmospheric pressure in an aqueous reaction medium without the addition of basic or acid reagents, without the formation of resinous byproducts which occurs to a certain extent during the hydrolysis of the tetrachlorinated product, which results in a further decrease in the yield.

It is the object of the invention to provide a process for the production of aromatic hydroxyaldehydes by which aromatic hydroxyaldehydes are obtained in better yields and in higher purity than by prior art methods.

In accordance with this invention this and other objects and advantages are achieved in a process for the production of an aromatic hydroxyaldehyde having the general formula:

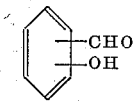

(I)

which may contain inert substituents and may have another benzene ring condensed onto the benzene ring, which comprises first chlorinating an aromatic methylchloroformic ester having the general formula:

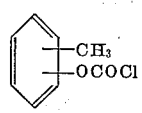

(II)

which may contain inert substitutents and which may have another benzene ring condensed onto the benzene ring to form an aromatic dichloromethylchloroformic ester having the general formula:

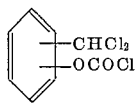

(III)

which may contain inert substituents and which may have another benzene ring condensed onto the benzene ring, and then hydrolyzing the resultant dichloromethylchloroformic ester (III) to the aromatic hydroxyaldehyde (I).

The aromatic dichloromethylchloroformic esters (III) may be hydrolyzed at a pressure as low as atmospheric pressure in an aqueous reaction medium without the addition of basic or acid reagents, without the formation of resinous byproducts being observed. Distillation of the aromatic methylchloroformic esters (II) and of the aromatic dichloromethylchloroformic esters (III) may be carried out in a comparatively simple manner because of the relatively low boiling points of the compounds.

Another benzene ring may be condensed onto the benzene ring of the aromatic hydroxyaldehyde (I) and consequently onto the benzene rings of the methylchloroformic ester (II) and the dichloromethylchloroformic ester (III). The said rings may also bear, as substituents, groups and/or atoms which are inert under the reaction conditions, for example chloride atoms, bromine atoms, nitro groups or lower alkoxy groups.

The production of the aromatic methylchloroformic esters (II) to be used as starting materials is known per se (cf. Houben-Weyl, "Methoden der organischen Chemie," vol. VIII, 101–104 (1952)). They are obtained for example by reaction of the corresponding methylphenols with phosgene, advantageously in the presence of acid-binding agents. Examples of suitable acid-binding agents are hydroxides, carbonates of the alkali metals or alkaline earth metals and particularly tertiary amines. Specific examples are potassium sodium and calcium hydroxide, potassium and sodium carbonate, triethylamine, dimethylaniline and pyridine. Phosgenation is advantageously carried out in an inert organic solvent such as an ether or an aromatic or aliphatic hydrocarbon which may be nitrated or halogenated.

Examples of suitable solvents are benzene, toluene, cumene, xylene, chlorobenzene, o-dichlorobenzene, nitrobenzene, carbon tetrachloride and ligroin. Phosgenation is generally carried out in the cold, advantageously at temperatures of from 0° to 50° C. The reaction mixture may be worked up for example by washing the product obtained after the reaction is over with water and separating the solvent by distillation from the organic phase. Depending on the degree of purity, the chloroformic ester remaining after the solvent has been distilled off may be used as such or used after vacuum distillation.

Examples of suitable starting materials (II) are the chloroformic esters of o-cresol, p-cresol, m-cresol, nitro-2-hydroxytoluene, 1-methylnaphthol-(2), 2-methylnaphthol-(1), 6-methylnaphthol-(2), the cresols being preferred.

The starting material (II) is converted in a conventional manner by the action of chlorine into the dichloromethylchloroformic ester (III). Chlorination is generally carried out at temperatures of from 50° to 200° C., preferably from 120° to 150° C. Chlorination is preferably carried out with exposure to ultraviolet light. Atmospheric pressure is generally used for the chlorination, but it is also possible to use slight superatmospheric pressure, for example 3 atmospheres, or subatmospheric pressure, for example 600 mm. Hg.

Chlorination may be effected in the presence of inert solvents, for example nitrated or chlorinated aromatic or aliphatic hydrocarbons such as carbon tetrachloride or trichlorobenzene. Chlorination is however preferably carried out in the absence of a solvent.

Chlorination may be carried out by allowing amount of 2 moles of chlorine per mole of starting material has been absorbed. We have found that the substitution of the hydrogen atoms of the methyl group does not take place in stages, but that the second or third hydrogen atoms of the methyl group is replaced before the first or second hydrogen atom of the methyl group has been replaced. It is therefore advantageous to allow the chlorine to act only for as long as no large amount of trichlorinated reaction product has been formed. Chlorination is therefore preferably carried out by allowing only about 1.2 to about 1.6 moles of chlorine to react with each mole of starting material and then to stop the chlorination. The reaction product is advantageously separated by rectification, the monochloro compound obtained being advantageously returned to the chlorination, while the dichloro compound is hydrolyzed to the aldehyde. When the process is carried out in this way practically no trichloro compound is obtained and the dichloromethylchloroformic ester (III) is of high purity.

Hydrolysis of the dichloromethylchloroformic ester (III) to the hydroxyaldehyde (I) may be carried out in an acid, neutral or basic aqueous medium. Mixtures of water with an organic solvent, particularly an organic solvent which is miscible with water, may be used for the hydrolysis. Examples of suitable organic solvents are ethers, alcohols, ketones, lower aliphatic carboxylic acids, lower amides, and trialkylamines. Specific examples are methanol, propanol, butanol, dioxane, tetrahydrofuran, glacial acetic acid, triethylamine, acetone, dimethylformamide. It is preferable however to use water alone as the medium for the hydrolysis. The ratio by weight of dichloromethylchloroformic ester (III) to the aqueous solvent is generally from 5:1 to 1:10, preferably from 1:2 to 1:5.

It is advantageous to use temperatures of from 30° to 150° C., preferably from 70° to 100° C., in the hydrolysis. When the boiling point or boiling point range of the hydrolysis mixture is higher than the reaction temperature, or when the hydrolysis is carried out under reflux, atmospheric pressure is advantageously used. Hydrolysis may however also be carried out at superatmospheric pressure, for example at the pressure which is set up in the closed reactor as the sum of the partial pressures of the reactants. It is however also possible to carry out the hydrolysis at subatmospheric pressure, for example 600 mm. Hg.

When the hydrolysis is carried out in a basic medium, the basic reagent used is preferably a hydroxide or carbonate of an alkali metal or alkaline earth metal. Examples of suitable basic reagents are sodium, potassium or calcium hydroxide or potassium carbonate. The amount of basic reagent is usually from 1 to 4 equivalents, preferably 2 or 3 equivalents, per mole of chloroformic ester. When the hydrolysis is carried out in an acid medium, generally organic acids, preferably mineral acids, are used as the acid reagents. Examples of suitable acids are hydrochloric acid, hydrobromic acid, sulfuric acid, phosphoric acid, acetic acid and chloroacetic acid. The acid reagent is generally used in a concentration of from 1 to 20% by weight, preferably from 5 to 15% by weight, with reference to the aqueous medium.

It is a particular advantage of the present process that the hydrolysis of the compounds (III) may also be carried out in aqueous medium without the addition of basic or acid reagents.

In hydrolysis in a basic reaction medium the hydrolysis mixture is advantageously acidified prior to being worked up, preferably by adding a mineral acid. Recovery of the aromatic hydroxyaldehyde (I) from the hydrolysis mixture may for example be carried out by an optical acidification followed by filtration of the organic phase or distilling off an azeotrope of the aldehyde with water and rectification of the organic layer.

The aromatic hydroxyaldehydes (I) are important intermediates for the production of for example dyes, perfumes and antioxidants.

The invention is illustrated by following examples in which parts are by weight. Parts by weight bear the same relation to parts by volume as the kilogram to the liter.

EXAMPLE 1

836 parts of o-cresolchloroformic ester is gassed with chlorine in a reactor while stirring at 120° to 140° C. with exposure to ultraviolet light until about 272 parts of chlorine have been absorbed. The reaction mixture is rectified in vacuo in a column packed with glass Raschig rings. 400 parts of monochloroformic ester having a boiling point of 125° C. at 12 mm. Hg and 700 parts of dichloro-o-cresolchloroformic ester having a boiling point of 134° C. at 13 mm. Hg are obtained. The monochloroformic ester is returned to the chlorination. The yield of dichlorocresolchloroformic ester is 98% of the theory.

For hydrolysis, 700 parts of dichlorocresolchloroformic ester is allowed to flow, with stirring, into 2800 parts of water which is at room temperature, the mixture thus heating up. The hydrolysis mixture is then kept at 90° C. for two hours while stirring, the progress of the hydrolysis being checked by titration of the chloride anions formed. The whole is then boiled so that an azeotrope of silicylaldehyde and water distils over, and the organic phase which separates as the lower layer is separated off and dried with anhydrous calcium chloride. 330 parts (92.5% of the theory) of salicylaldehyde having a boiling point of 196° C. at 160 mm. Hg is obtained.

The o-cresolchloroformic ester used as starting material is prepared as follows:

560 parts of phosgene is passed into a mixture of 2000 parts by volume of toluene and 540 parts of o-cresol in a stirred vessel having a capacity of 4000 parts by volume. 640 parts of dimethylaniline is then added with cooling to the reaction mixture at temperatures of from 10° to 25° C. When all has been added, the reaction mixture is kept for one hour at 40° C. and then the excess phogene is washed twice, each time with 500 parts of water. The washing water has caustic soda solution added to it until there is an alkaline reaction and the dimethylaniline is recovered and may be used for further reactions. Toluene is first distilled off from the organic layer and the residue is then distilled in vacuo. 836 parts (98% of the theory) of o-cresolchloroformic ester having a boiling point of 84° C. at 11 mm. Hg is obtained.

EXAMPLE 2

Chlorine is passed into 830 parts of p-cresolchloroformic ester (which has been prepared in the manner described in the third paragraph of this example) at 135° C. while being exposed to ultraviolet light until 270 parts of chlorine has been absorbed. After rectification in vacuo there is obtained as first runnings, 365 parts of the monochloroformic ester of p-cresol having a boiling point of 144° C. at 16 mm. Hg and a melting point of 56° C. and, as main fraction, 700 parts of dichloro-p-cresolchloroformic ester. The monochloro-chloroformic ester is returned to the chlorination. The yield of dichlorochloroformic ester is 97% of the theory.

For hydrolysis, 700 parts of dichloro-p-cresolchloroformic ester is allowed to flow, with stirring, into 2350 parts of 20% by weight aqueous caustic soda solution at room temperature. The reaction mixture is heated for two hours at 90° to 100° C. and about 20 parts of polymeric products is filtered off. The filtrate is then acidified to a pH of 6.8 and, after cooling, the precipitated p-hydroxybenzaldehyde is separated from the aqueous layer by filtration. 330 parts (92.5% of the theory) of very pure p-hydroxybenzaldehyde having a melting point of 116° C. is obtained. Another 5 parts of p-hydroxybenzoic acid is obtained upon further acidification to pH 4.

560 parts of phosgene is passed into a mixture of 2000 parts by volume of toluene and 450 parts of p-cresol in a stirred vessel having a capacity of 4000 parts by volume. 640 parts of dimethylaniline is then allowed to flow in at 25° C. while cooling. The reaction mixture is then kept at 40° C. for two hours and the excess phosgene is expelled by means of nitrogen. The product is washed twice, each time with 500 parts of water. Caustic soda solution is added to the washing water until it is alkaline and the dimethylaniline is recovered. By rectification of the organic layer there is obtained 830 parts of p-cresolchloroformic ester having a boiling point of 92° C. at 13 mm. Hg. This is equivalent to a yield of 97.4% of the theory.

We claim:
1. A process for the production of aromatic hydroxyaldehydes of the formula

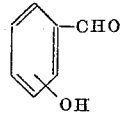

(I)

which may have another benzene ring condensed onto the benzene ring and which may contain an inert substituent selected from the group consisting of chlorine, bromine, nitro and lower alkoxy substituents which comprises: chlorinating a methylchloroformic acid ester of the formula

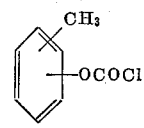

(II)

and which may have another benzene condensed onto the benzene ring and/or be substituted in the aforesaid manner, said chlorination being carried out at a temperature of from 50 to 200° C. and with exposure to ultraviolet light until 1.2 to 1.6 moles of chlorine per mole of the ester have been reacted to form a reaction mixture containing both the mono- and dichloromethylchloroformic ester, separating the mono- and dichloromethylchloroformic ester reaction products by rectification, returning the monochloromethylchloroformic ester to the chlorination reaction and hydrolyzing the dichloromethylchloroformic ester to form said compound (I), said hydrolysis being carried out in an aqueous medium at a temperature of from 30 to 150° C.

2. A process as claimed in claim 1 wherein the hydrolysis medium consists substantially of water.

References Cited

UNITED STATES PATENTS 1,023,758  4/1912  Raschig et al. _____ 260—600
3,314,998  4/1967  Levy et al. _____ 260—600

BERNARD HELFIN, Primary Examiner

U.S. Cl. X.R.

204—163 R; 260—463